United States Patent [19]
Smith et al.

[11] Patent Number: 6,055,435
[45] Date of Patent: Apr. 25, 2000

[54] WIRELESS TELEPHONE CONNECTION SURGE SUPPRESSOR

[75] Inventors: Gordon E. Smith, Sandy; Scott R. Bullock, South Jordan; John M. Knab, Sandy, all of Utah

[73] Assignee: Phonex Corporation, Midvale, Utah

[21] Appl. No.: 08/951,907

[22] Filed: Oct. 16, 1997

[51] Int. Cl.[7] .................................................. H04Q 7/32
[52] U.S. Cl. .................. 455/462; 455/402; 340/310.01; 340/310.08; 340/310.06; 340/310.03; 370/493; 370/494; 370/495; 370/487; 370/490; 370/489
[58] Field of Search .................................. 455/462, 74.1, 455/14, 465, 402, 550, 575, 90; 364/492; 340/310.01, 310.08, 310.06, 310.03; 375/36, 37; 370/493, 494, 495, 487, 490, 489

[56] References Cited

U.S. PATENT DOCUMENTS

| | | | |
|---|---|---|---|
| 2,510,273 | 6/1950 | Barstow et al. | 179/3.5 |
| 2,516,211 | 7/1950 | Hochgraf | 179/3.5 |
| 2,516,763 | 7/1950 | Edson et al. | 179/2.5 |
| 2,535,446 | 12/1950 | Mitchell | 179/2.5 |
| 2,567,908 | 9/1951 | Levy | 177/356 |
| 2,577,731 | 12/1951 | Berger | 179/2.5 |
| 2,654,805 | 10/1953 | Deer | 179/2.5 |
| 2,820,097 | 1/1958 | Finlay | 179/2.5 |
| 2,828,363 | 3/1958 | Ray | 179/2.5 |
| 2,932,794 | 4/1960 | Crow | 328/156 |
| 3,045,066 | 7/1962 | Beuscher | 179/2.5 |
| 3,280,259 | 10/1966 | Cotter | 179/2.5 |
| 3,334,185 | 8/1967 | Marlot | 179/2.5 |
| 3,369,078 | 2/1968 | Stradley | 179/2.5 |
| 3,399,397 | 8/1968 | Josephson | 340/216 |
| 3,400,221 | 9/1968 | Wolters | 179/2.5 |
| 3,475,561 | 10/1969 | Krasin et al. | 179/15 |
| 3,521,267 | 7/1970 | Lester et al. | 340/310 |
| 3,529,216 | 9/1970 | Kolm et al. | 317/147 |
| 3,659,280 | 4/1972 | Donohoo | 340/310 |
| 3,693,155 | 9/1972 | Crafton et al. | 340/147 R |
| 3,810,096 | 5/1974 | Kabat et al. | 340/147 R |
| 3,818,481 | 6/1974 | Dorfman et al. | 340/310 R |
| 3,846,638 | 11/1974 | Wetherell | 307/3 |
| 3,852,740 | 12/1974 | Haymes | 340/416 |
| 3,876,984 | 4/1975 | Chertok | 340/152 R |
| 3,911,415 | 10/1975 | Whyte | 340/310 A |
| 3,922,664 | 11/1975 | Wadsworth | 340/276 |
| 3,924,223 | 12/1975 | Whyte et al. | 340/310 R |
| 3,925,728 | 12/1975 | Whyte | 324/142 |
| 3,925,763 | 12/1975 | Wadhwani et al. | 340/164 R |
| 3,942,168 | 3/1976 | Whyte | 340/310 R |

(List continued on next page.)

FOREIGN PATENT DOCUMENTS

| | | | |
|---|---|---|---|
| B1-12488/76 | 10/1977 | Australia | H04B 3/54 |
| 1057436 | 6/1979 | Canada | H04M 1/72 |
| 1 216 689 | 1/1987 | Canada | H04M 1/72 |
| 0 078 171 | 10/1982 | European Pat. Off. | H02J 13/00 |
| 000 555 869 A2 | 8/1993 | European Pat. Off. | H04B 3/54 |

(List continued on next page.)

*Primary Examiner*—Wellington Chin
*Assistant Examiner*—Keith Ferguson
*Attorney, Agent, or Firm*—Lloyd W. Sadler

[57] ABSTRACT

A wireless power line carrier voice and data communication device is provided. The device permits a user to connect one or more electronic devices to surge suppress and isolated AC power connections while simultaneously providing a communication channel between telephone equipment, such as telephone extensions, modems and/or facsimile machines, across the AC power lines to a remote telephone connection. This invention prevents the degradation of the voice and/or data signal across the power lines that would otherwise be induced by the AC connected electronic equipment. Furthermore, this invention provides a cost effective, convenient solution to the data processing user who requires access to telephone lines, for voice, data or both, as well as AC power outlets for electronic equipment all from a physical location some distance from a convenient phone connector. The isolation and surge suppression circuitry is designed specifically to address the power line carrier environment.

5 Claims, 5 Drawing Sheets

U.S. PATENT DOCUMENTS

| | | | |
|---|---|---|---|
| 3,949,172 | 4/1976 | Brown et al. | 455/402 |
| 3,967,264 | 6/1976 | Whyte et al. | 340/310 A |
| 3,973,087 | 8/1976 | Fong | 179/170 R |
| 3,980,954 | 9/1976 | Whyte | 325/48 |
| 4,012,733 | 3/1977 | Whyte | 340/310 A |
| 4,012,734 | 3/1977 | Jagoda et al. | 340/310 A |
| 4,016,429 | 4/1977 | Vercellotti et al. | 307/149 |
| 4,057,793 | 11/1977 | Johnson et al. | 340/310 R |
| 4,058,678 | 11/1977 | Dunn et al. | 179/2.5 R |
| 4,065,763 | 12/1977 | Whyte et al. | 340/310 R |
| 4,107,656 | 8/1978 | Farnsworth | 340/151 |
| 4,161,027 | 7/1979 | Russell | 364/492 |
| 4,173,754 | 11/1979 | Feiker | 340/310 R |
| 4,174,517 | 11/1979 | Mandel | 340/310 A |
| 4,218,655 | 8/1980 | Johnston et al. | 455/39 |
| 4,222,035 | 9/1980 | Lohoff | 340/167 R |
| 4,239,940 | 12/1980 | Dorfman | 179/2.51 |
| 4,254,403 | 3/1981 | Perez-Cavero et al. | 340/310 R |
| 4,307,380 | 12/1981 | Gander | 340/310 R |
| 4,321,581 | 3/1982 | Tappeiner et al. | 340/310 R |
| 4,323,882 | 4/1982 | Gajjar | 340/310 R |
| 4,344,066 | 8/1982 | Beggs | 340/310 A |
| 4,357,598 | 11/1982 | Melvin, Jr. | 340/310 A |
| 4,371,867 | 2/1983 | Gander | 340/310 R |
| 4,377,804 | 3/1983 | Suzuki | 340/310 A |
| 4,386,436 | 5/1983 | Kocher et al. | 455/151 |
| 4,400,688 | 8/1983 | Johnston et al. | 340/310 R |
| 4,408,185 | 10/1983 | Rasmussen | 340/310 A |
| 4,408,186 | 10/1983 | Howell | 340/310 A |
| 4,429,299 | 1/1984 | Kabat et al. | 340/310 A |
| 4,433,326 | 2/1984 | Howell | 340/310 A |
| 4,442,319 | 4/1984 | Treidl | 179/2 A |
| 4,442,546 | 4/1984 | Ishigaki | 455/72 |
| 4,455,651 | 6/1984 | Baran | 370/104 |
| 4,471,168 | 9/1984 | Cripps | 455/462 |
| 4,471,399 | 9/1984 | Udren | 361/64 |
| 4,473,817 | 9/1984 | Perkins | 340/310 R |
| 4,475,193 | 10/1984 | Brown | 370/124 |
| 4,479,033 | 10/1984 | Brown et al. | 179/2.51 |
| 4,495,386 | 1/1985 | Brown et al. | 179/2.51 |
| 4,514,594 | 4/1985 | Brown et al. | 179/2.51 |
| 4,523,307 | 6/1985 | Brown et al. | 370/30 |
| 4,535,447 | 8/1985 | Rosanes et al. | 370/77 |
| 4,538,136 | 8/1985 | Drabing | 340/310 R |
| 4,544,808 | 10/1985 | Milne et al. | 179/99 |
| 4,556,864 | 12/1985 | Roy | 340/310 A |
| 4,556,865 | 12/1985 | Fukagawa et al. | 340/310 A |
| 4,556,866 | 12/1985 | Gorecki | 340/310 A |
| 4,559,520 | 12/1985 | Johnston | 340/310 R |
| 4,599,598 | 7/1986 | Komoda et al. | 340/310 A |
| 4,609,839 | 9/1986 | Howell | 307/542 |
| 4,611,274 | 9/1986 | Machino et al. | 364/200 |
| 4,633,218 | 12/1986 | Palsgrove et al. | 340/310 A |
| 4,638,298 | 1/1987 | Spiro | 340/827 |
| 4,638,299 | 1/1987 | Campbell | 340/310 A |
| 4,641,126 | 2/1987 | Crowe | 340/310 A |
| 4,641,322 | 2/1987 | Hasegawa | 375/1 |
| 4,642,607 | 2/1987 | Strom et al. | 340/310 A |
| 4,644,321 | 2/1987 | Kennon | 340/310 A |
| 4,675,648 | 6/1987 | Roth et al. | 340/310 A |
| 4,701,945 | 10/1987 | Pedigo | 379/66 |
| 4,745,391 | 5/1988 | Gajjar | 340/310 A |
| 4,745,392 | 5/1988 | Ise et al. | 340/310 R |
| 4,746,897 | 5/1988 | Shuey | 340/310 R |
| 4,749,992 | 6/1988 | Fitzemeyer et al. | 340/870.02 |
| 4,759,016 | 7/1988 | Otsuka | 370/95 |
| 4,763,103 | 8/1988 | Galula et al. | 340/310 R |
| 4,772,870 | 9/1988 | Reyes | 340/310 R |
| 4,774,493 | 9/1988 | Rabinowitz | 340/310 A |
| 4,783,780 | 11/1988 | Alexis | 370/95 |
| 4,788,527 | 11/1988 | Johansson | 340/310 A |
| 4,809,296 | 2/1989 | Braun et al. | 375/1 |
| 4,829,570 | 5/1989 | Schotz | 381/3 |
| 4,835,517 | 5/1989 | van der Gracht et al. | 340/310 A |
| 4,845,466 | 7/1989 | Hariton et al. | 340/310 R |
| 4,847,903 | 7/1989 | Schotz | 381/3 |
| 4,864,589 | 9/1989 | Endo | 375/1 |
| 4,866,733 | 9/1989 | Morishita | 375/1 |
| 4,890,089 | 12/1989 | Shuey | 340/310 A |
| 4,912,553 | 3/1990 | Pal et al. | 358/86 |
| 4,962,496 | 10/1990 | Vercellotti et al. | 370/11 |
| 4,963,853 | 10/1990 | Mak | 340/310 A |
| 4,968,970 | 11/1990 | LaPorte | 340/310 A |
| 4,988,972 | 1/1991 | Takagi | 340/310 A |
| 4,995,053 | 2/1991 | Simpson et al. | 375/1 |
| 5,003,457 | 3/1991 | Ikei et al. | 364/133 |
| 5,032,833 | 7/1991 | Laport | 340/825.02 |
| 5,049,876 | 9/1991 | Kahle et al. | 340/825.57 |
| 5,063,563 | 11/1991 | Ikeda et al. | 370/110.1 |
| 5,065,133 | 11/1991 | Howard | 340/310 A |
| 5,066,939 | 11/1991 | Mansfield, Jr. | 340/310 R |
| 5,136,612 | 8/1992 | Bi | 375/1 |
| 5,151,838 | 9/1992 | Dockery | 340/310 R |
| 5,155,466 | 10/1992 | Go | 340/310 R |
| 5,168,510 | 12/1992 | Hill | 375/40 |
| 5,187,865 | 2/1993 | Dolin, Jr. | 29/868 |
| 5,192,231 | 3/1993 | Dolin, Jr. | 439/620 |
| 5,210,518 | 5/1993 | Graham et al. | 340/310 R |
| 5,241,283 | 8/1993 | Sutterlin | 330/51 |
| 5,257,006 | 10/1993 | Graham et al. | 340/310 A |
| 5,262,755 | 11/1993 | Mak et al. | 340/310 R |
| 5,278,771 | 1/1994 | Nyenya | 364/492 |
| 5,278,862 | 1/1994 | Vander Mey | 375/1 |
| 5,289,476 | 2/1994 | Johnson et al. | 371/37.1 |
| 5,319,634 | 6/1994 | Bartholomew et al. | 370/18 |
| 5,327,230 | 7/1994 | Dockery | 348/8 |
| 5,349,644 | 9/1994 | Massey et al. | 395/200 |
| 5,351,272 | 9/1994 | Abraham | 375/38 |
| 5,355,114 | 10/1994 | Sutterlin et al. | 340/310 A |
| 5,357,541 | 10/1994 | Cowart | 375/1 |
| 5,404,127 | 4/1995 | Lee et al. | 340/310.02 |
| 5,406,248 | 4/1995 | Le Van Suu | 340/310.01 |
| 5,406,249 | 4/1995 | Pettus | 340/310.06 |
| 5,410,292 | 4/1995 | Le Van Suu | 340/310.06 |
| 5,412,369 | 5/1995 | Kirchner | 340/310.03 |
| 5,424,709 | 6/1995 | Tal | 340/310.01 |
| 5,448,593 | 9/1995 | Hill | 375/267 |
| 5,452,344 | 9/1995 | Larson | 379/107 |
| 5,461,629 | 10/1995 | Sutterlin et al. | 371/30 |
| 5,463,662 | 10/1995 | Sutterlin et al. | 375/351 |
| 5,467,011 | 11/1995 | Hunt | 324/67 |
| 5,471,190 | 11/1995 | Zimmermann | 340/310.01 |
| 5,504,454 | 4/1996 | Daggett et al. | 329/304 |
| 5,530,737 | 6/1996 | Bartholomew et al. | 455/462 |
| 5,554,968 | 9/1996 | Lee | 340/310.01 |
| 5,559,377 | 9/1996 | Abraham | 307/104 |
| 5,630,204 | 5/1997 | Hylton et al. | 455/3.3 |
| 5,805,998 | 9/1998 | Kodama | 455/462 |

FOREIGN PATENT DOCUMENTS

| | | | |
|---|---|---|---|
| 544243 | 4/1942 | United Kingdom . | |
| 549948 | 12/1942 | United Kingdom . | |
| 553225 | 5/1943 | United Kingdom . | |
| 683265 | 11/1952 | United Kingdom . | |
| 1393424 | 5/1971 | United Kingdom . | |
| 2 094 598 | 2/1982 | United Kingdom | H04B 3/54 |
| WO 88/09589 | 5/1988 | WIPO | H04H 5/00 |
| WO 90/13950 | 4/1990 | WIPO . | |
| WO 91/07833 | 11/1990 | WIPO | H04M 1/60 |
| WO 93/07693 | 10/1992 | WIPO | H04J 13/00 |
| WO 93/23928 | 5/1993 | WIPO | H04B 1/38 |
| WO 94/22257 | 3/1994 | WIPO | H04M 9/00 |
| WO 95/19070 | 1/1995 | WIPO | H04B 3/54 |

WIRELESS TELEPHONE CONNECTION SURGE SUPPRESSOR

BACKGROUND OF THE INVENTION

1. Field of the Invention

This invention relates to electronic communications systems for remote signaling to a telephone line over available AC power lines. More particularly, this invention relates to a wireless telephone connection system which provides both electric power line surge suppression and isolation circuitry to prevent degradation of the communication signal due to power line noise generated by nearby electrical equipment or electronic devices.

2. Description of Related Art

It is desirable in power line carrier communication systems to be able to electrically isolate the communications device, e.g., a telephone, a facsimile machine, and/or a modem, from power line noise induced by other electrical equipment on the same or a nearby circuit. Failure to consider and isolate electronics equipment from communications equipment, especially communications equipment which makes use of the power line as the communication medium, can cause the communication signal to become so degraded that the reliability of the communication channel is significantly reduced. Power line carrier communication systems offer significant advantages to standard wired or wireless radio type communications, including reduced costs, pre-existent wiring, no need for an allocation of limited radio frequency channels, and increased signal security.

A variety of power line carrier telephone voice and/or data communication systems have been developed and are used to facilitate telephonic communications in locations where little or no availability exists for dedicated telephone wires. While these devices provide a connection to the existing power lines they do not incorporate the filtering and isolation circuitry necessary to protect the voice and/or data signal from power line noise due to nearby equipment also plugged into the existing power lines. Surge suppression circuits in general are well known in the related art, as are isolation circuits. However, for optimum performance, surge suppression and isolation should be matched to the unique requirements of power line carrier communications and, to minimize ringing and other capacitive effects, should be placed in close physical proximity to the connection between the communications device and the power line.

The most common alternatives to the present invention are (1) ignoring the problem and attempting to operate in a potentially high noise environment; (2) using separate standard commercially available surge suppressors and/or isolators without accounting for the line matching and proximity issues; (3) designing custom isolation equipment for each site and attempting to tune such isolators to the power line environment.

A very wide variety of power line carrier communications devices, systems and methods have been previously disclosed, and could be considered related art, although not prior art. Each of which may address a particular power line carrier communication problem and each of which may, in certain instances, be used in combination with the present invention to improve power line carrier communications. For background material as to the previously disclosed devices, systems and methods concerning power line carrier communications, the reader is directed to the following United States and foreign patent documents: U.S. Pat. Nos. 2,510,273, 2,516,211, 2,516,763, 2,535,446, 2,567,908, 2,577,731, 2,654,805, 2,820,097, 2,828,363, 2,932,794, 3,045,066, 3,280,259, 3,334,185, 3,369,078, 3,399,397, 3,400,221, 3,475,561, 3,521,267, 3,529,216, 3,659,280, 3,693,155, 3,810,096, 3,818,481, 3,846,638, 3,852,740, 3,876,984, 3,911,415, 3,922,664, 3,924,223, 3,925,763, 3,925,728, 3,942,168, 3,949,172, 3,967,264, 3,973,087, 3,980,954, 4,012,733, 4,012,734, 4,016,429, 4,057,793, 4,058,678, 4,065,763, 4,107,656, 4,161,027, 4,173,754, 4,174,517, 4,218,655, 4,222,035, 4,239,940, 4,254,403, 4,307,380, 4,321,581, 4,323,882, 4,344,066, 4,357,598, 4,371,867, 4,377,804, 4,386,436, 4,400,688, 4,408,185, 4,408,186, 4,429,299, 4,433,326, 4,442,319, 4,471,399, 4,473,817, 4,475,193, 4,479,033, 4,495,386, 4,514,594, 4,523,307, 4,535,447, 4,538,136, 4,556,864, 4,556,865, 4,556,866, 4,559,520, 4,599,598, 4,609,839, 4,611,274, 4,633,218, 4,638,298, 4,638,299, 4,641,126, 4,641,322, 4,642,607, 4,644,321, 4,675,648, 4,701,945, 4,745,391, 4,745,392, 4,746,897, 4,749,992, 4,759,016, 4,763,103, 4,772,870, 4,774,493, 4,783,780, 4,788,527, 4,809,296, 4,829,570, 4,835,517, 4,845,466, 4,847,903, 4,864,589, 4,866,733, 4,890,089, 4,912,553, 4,962,496, 4,963,853, 4,968,970, 4,988,972, 4,995,053, 5,003,457, 5,032,833, 5,049,876, 5,063,563, 5,065,133, 5,066,939, 5,136,612, 5,151,838, 5,155,466, 5,168,510, 5,187,865, 5,192,231, 5,210,518, 5,241,283, 5,257,006, 5,262,755, 5,278,862, 5,289,476, 5,319,634, 5,327,230, 5,349,644, 5,351,272, 5,355,114, 5,357,541, 5,404,127, 5,406,248, 5,406,249, 5,410,292, 5,412,369, 5,424,709, 5,448,593, 5,452,344, 5,461,629, 5,463,662, 5,467,011, 5,471,190, 5,504,454, 5,530,737, 5,554,968, 5,559,377, 5,630,204, GB 544,243, GB 549,948, GB 553,225, GB 683,265, GB 1,393,424, GB 2,094,598, AU-B1-12,488/76, Canada 1057436, Canada 1216689, EPO 0 078 171 A2, EPO 0 555 869 A2, PCT/US83/01717, PCT/US90/02291, PCT/US90/06701, PCT/US92/08510, PCT/US93/04726, PCT/US94/03110, and PCT/US95/00354 each of which is hereby incorporated by reference in its entirety for the material disclosed therein. Applicant is aware of a large number of references to wireless but not power line carrier communication systems. Because the present invention relates primarily to power line carrier communications, applicant believes that wireless but not power line carrier references are not relevant to the consideration of this application.

SUMMARY OF THE INVENTION

It is desirable to provide a wireless phone connection for modems and other telephone equipment, using power lines available in the user's building or structure, while providing connections to the associated computer equipment. Moreover, it is desirable to provide a wireless telephone or modem connection embedded into a surge suppressor to provide multiple AC connections with surge suppression to prevent degradation of the modem or telephone signal from the nearby equipment. Furthermore, it is desirable to provide a telephone or modem connection to a power line carrier which incorporates signal isolation circuitry to isolate the wireless telephone or modem from surge circuitry, which otherwise can attenuate the RF signal of the wireless telephone or modem.

It is an object of this invention to provide a wireless telephone or modem connection incorporated into an AC outlet surge suppressor to provide multiple AC power connections with surge suppression along with a wireless telephone line connection.

It is a further object of this invention to provide surge suppression circuitry which includes isolation circuitry to isolate the telephone or modem signal from the attenuation effects of the surge suppressor.

It is a further object of this invention to provide an embedded telephone or modem connection to a power line communication channel wherein the telephone or modem connection is embedded into an AC power surge suppressor and is adapted to optimize the performance of the power line communication channel.

These and other objectives of this invention will be readily apparent to the reader upon consideration of the attached drawings and of the following detailed description of those drawings, the preferred embodiment of the invention, and the claims.

These and other objectives of this invention are achieved, in the preferred embodiment of the invention, by an electronic device in which a base unit is plugged into the AC power outlet near a telephone line. The base unit can be either a power line carrier (wireless) telephone jack base unit or a power line carrier (wireless) modem jack base unit. An extension unit, from either the wireless telephone jack or the wireless modem jack is connected to a second AC power outlet. An isolator circuit is used between the wireless telephone or modem jacks and a surge suppressor which in turn is connected to surge protected AC outlets. The surge circuitry provides surge protection and filtering, while the isolation circuit maintains signal levels from the RF attenuation otherwise induced by the surge suppressor.

DETAILED DESCRIPTION OF THE INVENTION

Figure 1:
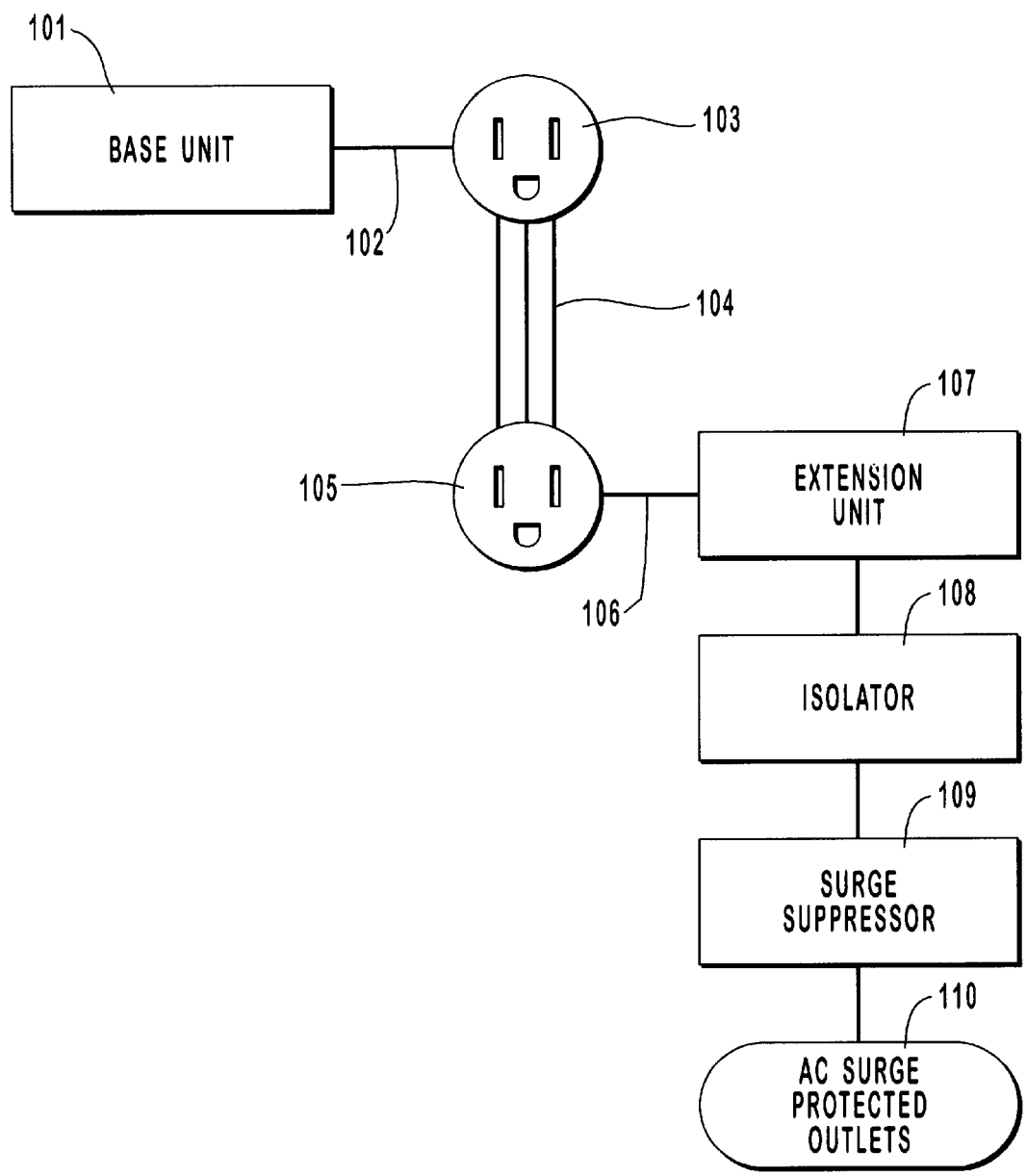
FIG. 1 is a top level block diagram showing the major sections of the invention.

This invention is a wireless power line carrier telephone or modem connection embedded into a surge suppressor to provide multiple AC power connections with surge suppression and signal isolation along with the wireless telephone or modem connection. The preferred embodiment of the invention includes the major components and connections shown in FIG. 1. A base unit 101 is provided to receive and transmit signals to and from a standard telephone connector across a the AC power line to and from an extension unit 107. The base unit 101 is connected to a standard AC wall outlet 103 across a power cable 102. The base unit 101 can be either a wireless telephone jack base unit or a wireless modem jack base unit. For exemplary purposes in this application a wireless modem jack is described, however, the invention works similarly with a wireless telephone jack. The extension unit 107 is connected to the AC power line 104 and from there to the base unit 101 by being plugged into a second standard AC power outlet 105, using a second power cable 106. The extension unit 107, which can also be a wireless phone jack or a wireless modem jack, and which for the purposes of description in this application is a wireless modem jack, provides the remote telephone or modem connection by providing the user with the freedom to physically position a telephone or modem without the constraint of prior placement of telephone connectors, so long as a standard AC wall outlet is available. An isolator circuit 108 is provided to isolate the wireless phone or modem jack from the electrical equipment that will be plugged into the provided outlets 110, thereby minimizing the attenuation of the wireless phone or modem jack signals. Surge suppression circuitry 109 is provided between the isolator 108 and the surge protected outlets 110. This invention provides critical flexibility to computer users who have need of surge suppressed AC power outlets, a modem connection and a means of connecting the modem signal to an external telephone line, without requiring that the placement of the computer, modem and phone equipment be constrained by the generally prior placement of standard telephone connections. Any place where AC power is available becomes available to the user for telephonic or modem communications. Moreover, the surge suppression and isolation circuitry provided in this invention provides unique and novel synergy, while simultaneously providing signal conditioning and electrical noise isolation essential to improving the quality and reliability of the telephone and/or modem communication over the power line carrier.

Figure 2:
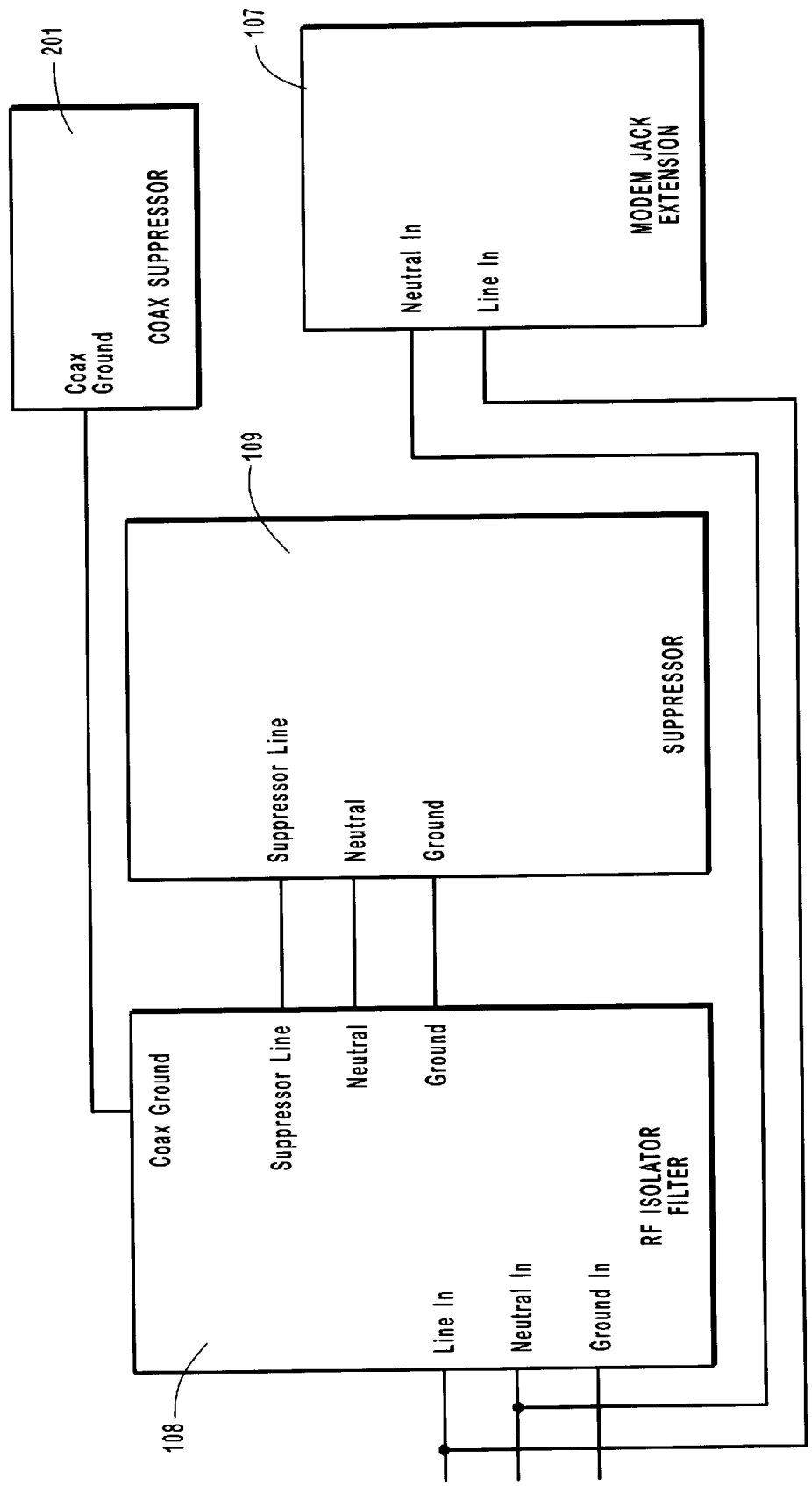
FIG. 2 is a detailed interface diagram of the isolator and suppressor sections of the invention.

FIG. 2 is a detailed interface block diagram of the isolator and surge suppressor sections of the invention. The isolator 108 is shown receiving three-wire AC power in, signals labeled "Line In," "Neutral In," and "Ground In." Output from the isolator 108 to the suppressor 109 are "Suppressor Line," "Neutral," and "Ground." FIG. 2 also shows how the modem jack extension 107 communicates with the power line, across the "Neutral" and "Line In" lines. A coax suppress or 201 is provided to permit connection to electronic equipment which requires a coax connection for receiving power.

Figure 3:
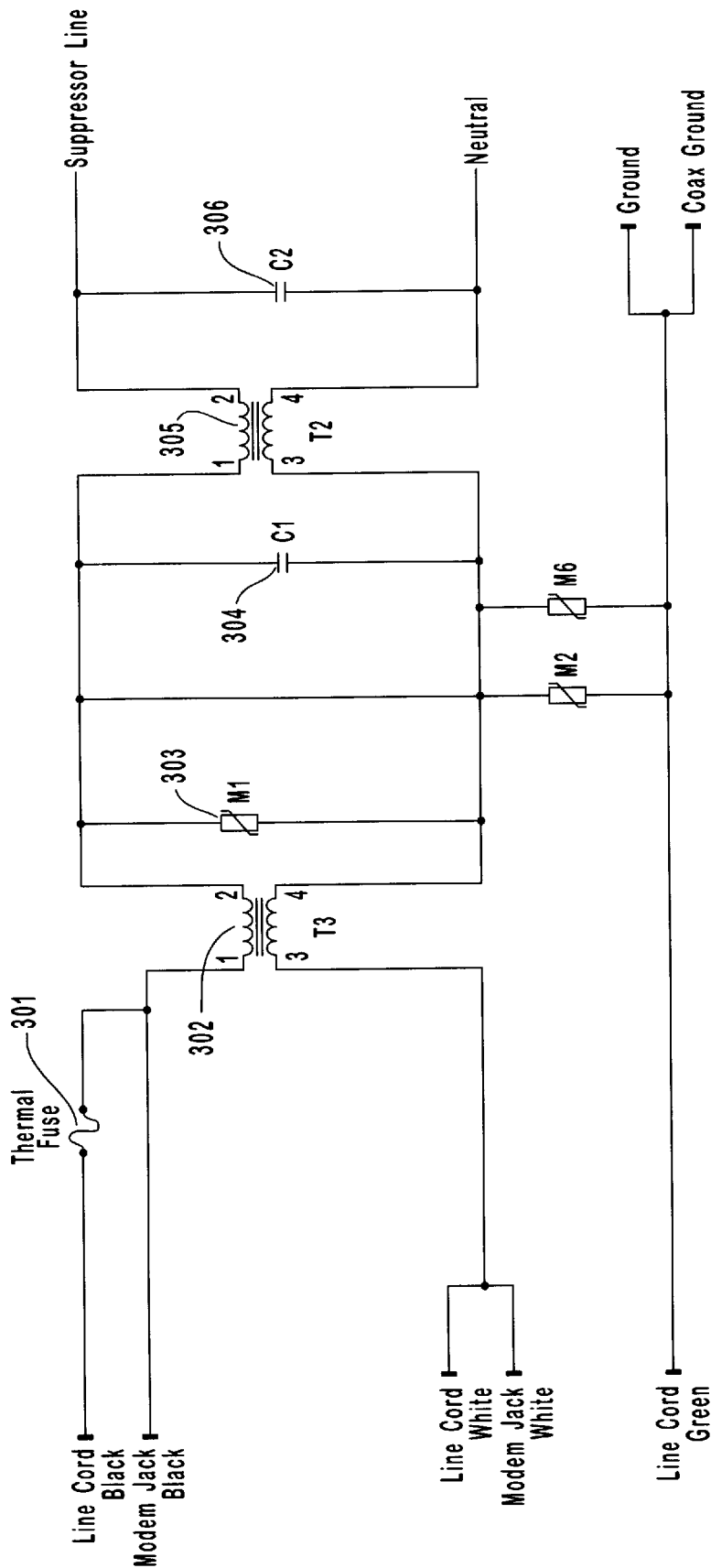
FIG. 3 is a detailed schematic of the preferred embodiment of the isolator circuit of the invention.

FIG. 3 shows the detailed schematic of the preferred embodiment of the isolator circuit 108. "Line In" power first passes through a fuse 301 for surge protection. Power and Neutral then pass through a line filter which includes a first torroid 302, having an inductance of approximately 4.5 $\mu$H in each coil, an adjustable resistor 303, capacitor 304, having a capacitance of approximately 0.1 $\mu$F, a second torroid 305, also having an inductance of approximately 4.5 $\mu$H in each coil and a second capacitor 306, also having a capacitance of approximately 0.1 $\mu$F. The output of this isolator is fed to the suppressor 109. Two other adjustable resistors and line conductors 307, 308 are used to provide high voltage protection between the cord ground and Neutral in the filter.

Figure 4:
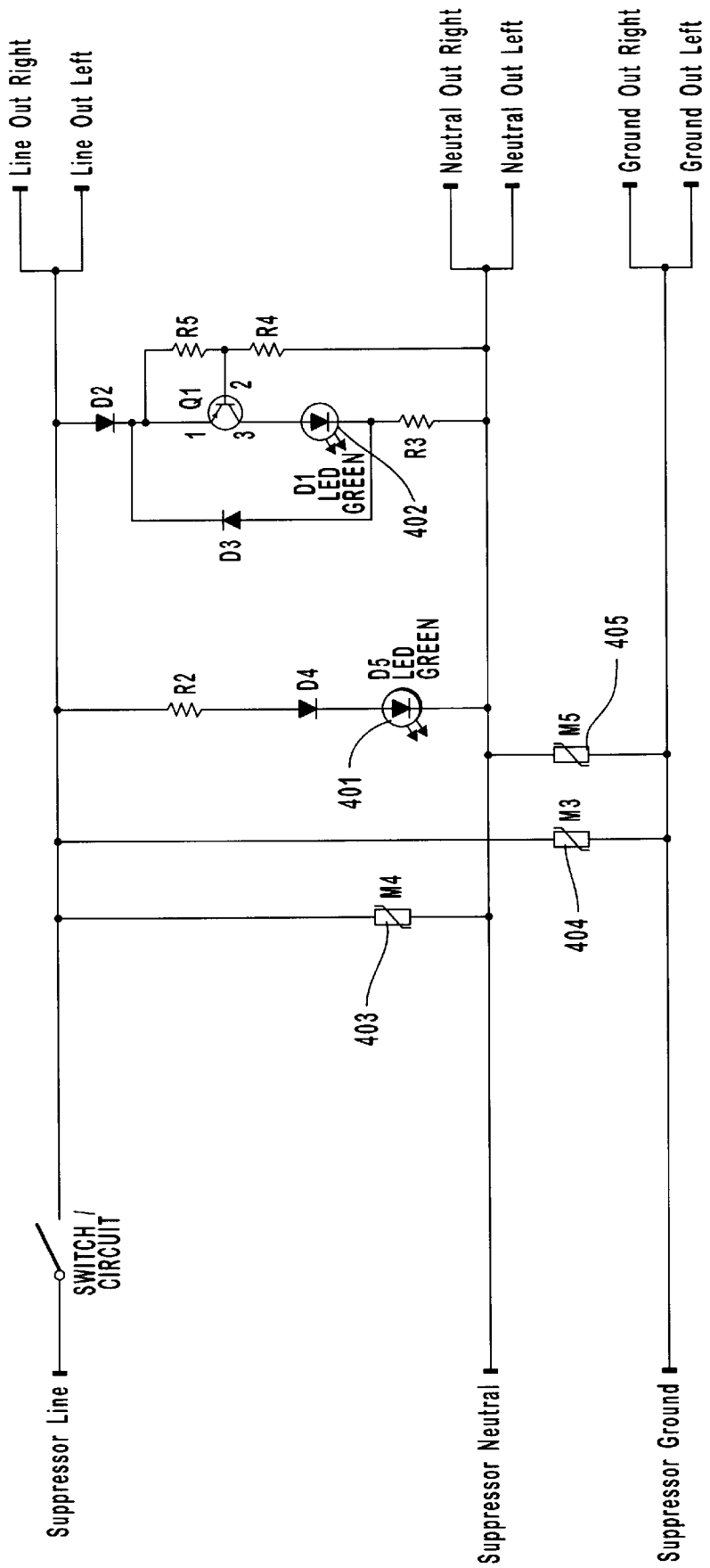
FIG. 4 is a detailed schematic of the preferred embodiment of the surge suppressor circuit of the invention.

FIG. 4 shows the detailed schematic of the preferred embodiment of the suppressor circuit 109. Light Emitting Diodes (LEDs) 401 and 402 are provided to designate the status of the power line to the user. While adjustable resistors 403, 404, 405 provide the high voltage protection for the surge suppressor. In the preferred embodiment of the invention, the adjustable resistors are metal oxide varistors (MOVs).

Figure 5:
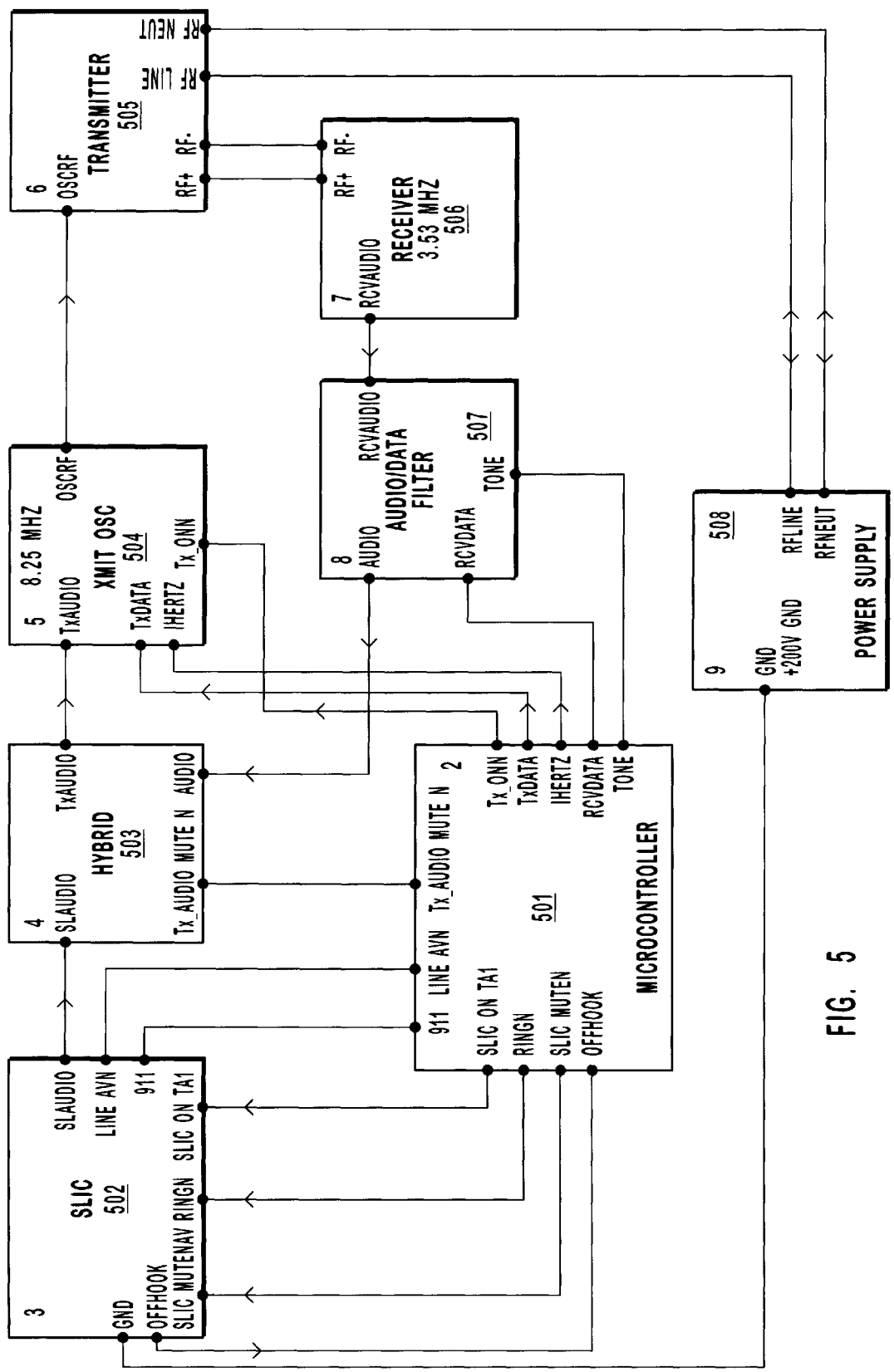
FIG. 5 is a detailed interface diagram of the preferred embodiment of the extension unit of the invention.

FIG. 5 shows the detailed interface block diagram of the preferred embodiment of the extension unit 107 of the invention. A microcontroller 501 is provided to control the functions of the extension unit 107. A subscriber line interface circuit (SLIC) 502 is provided to receive the standard telephone or modem RJ-11 connection from the user's telephone extension or modem. A hybrid circuit 503 is provided to providing a mute capability to the received audio signal. A transmit oscillator 504 is provided which receives transmitted audio from the hybrid circuit 503 and generates the RF carrier signal for the transmitter 505. The transmitter 505 receives the RF carrier signal from the transmit oscillator (XMIT OSC) 504 and produces the RF line carrier signals for transmitting across the power lines. A receiver 506 is provided which receives power line RF signals and generates a received audio signal. The audio/data filter 507 receives the received audio signal from the receiver 506 and splits off audio and data for transmission to the user's telephone extension or modem. The power supply circuit 508 receives and transmits RF line carrier signals from and to the transmitter 505 interfaces with the AC power lines.

We claim:

1. A wireless communications apparatus for connecting a conventional extension telephone or modem to a conventional telephone line using available AC power lines, the apparatus comprising:

(A) a base unit connected to an AC power line for the transmission and receipt of voice and data signals over said AC power line;

(B) an extension unit connected to an AC power line for the transmission and receipt of voice and data signals to and from said base unit over said AC power line;

(C) an isolator, electrically connected to said extension unit to provide signal isolation for voice and data signals being transmitted over said AC power line;

(D) a surge suppressor, electrically connected to said isolator to suppress the electrical surges for the benefit of equipment which may be connected onto the AC power line; and (E) a surge protected AC outlet electrically connected to said surge suppressor, provided to give an AC power connection to any equipment which may be require connection onto the AC power line.

2. A wireless communications apparatus for connecting a conventional extension telephone or modem to a conventional telephone line using available AC power lines, as recited in claim 1, said base unit further comprising:

(i) a first transmitter transmitting signals to the AC power lines;

(ii) a first receiver receiving signals from the AC power lines; and (iii) a first controller controlling the receipt and transmission of signals across the AC power lines, wherein said controller communicates electronically with said transmitter and said receiver.

3. A wireless communications apparatus for connecting a conventional extension telephone or modem to a conventional telephone line using available AC power lines, as recited in claim 1, said extension unit further comprising:

(i) a transmitter transmitting signals to the AC power lines;

(ii) a receiver receiving signals from the AC power lines; and (iii) a controller controlling the receipt and transmission of signals across the AC power lines, wherein said second controller communicates electrically with said second transmitter and said second receiver.

4. A wireless communications apparatus for connecting a conventional extension telephone or modem to a conventional telephone line using available AC power lines, as recited in claim 1, said isolator further comprising a means for filtering and isolating a signal between a plurality of AC power connections.

5. A wireless communications apparatus for connecting a conventional extension telephone or modem to a conventional telephone line using available AC power lines, as recited in claim 1, said surge suppressor further comprising a means for providing power line signal suppression to protect equipment which may be connect to the power line from voltage or current surges.

* * * * *